US006403036B1

(12) United States Patent
Rodgers et al.

(10) Patent No.: US 6,403,036 B1
(45) Date of Patent: Jun. 11, 2002

(54) TEMPERATURE MONITORING SYSTEM FOR AN AUTOMATED BIOLOGICAL REACTION APPARATUS

(75) Inventors: Paula M. Rodgers; Kimberly K. C. Christensen, both of Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 09/408,033

(22) Filed: Sep. 29, 1999

(51) Int. Cl.$^7$ .................................... G01K 11/06

(52) U.S. Cl. .............................. 422/67; 422/61; 436/1; 436/166; 436/169

(58) Field of Search ............................ 436/1, 164, 166, 436/169; 422/58, 61, 67

(56) References Cited

U.S. PATENT DOCUMENTS

| | | | | |
|---|---|---|---|---|
| 3,214,278 A | * 10/1965 | Mylo | | |
| 4,912,304 A | 3/1990 | Philippbar | .................. | 219/543 |
| 5,215,378 A | * 6/1993 | Manske | ...................... | 374/105 |
| 5,254,473 A | * 10/1993 | Patel | ............................. | 436/1 |
| 5,595,707 A | 1/1997 | Copeland et al. | ............. | 422/64 |
| RE35,716 E | 1/1998 | Stapleton et al. | .............. | 435/3 |

FOREIGN PATENT DOCUMENTS

| | | |
|---|---|---|
| EP | 0819750 A1 | 7/1997 |
| FR | 2665957 | * 2/1992 |
| GB | 1600062 | 10/1981 |
| WO | WO 99/08090 | 2/1999 |

OTHER PUBLICATIONS

Omega Engineering, Inc. The Omega Complete Temperature Measurement Handbook and Encyclopedia, 1989.

* cited by examiner

*Primary Examiner*—Lyle A. Alexander
(74) *Attorney, Agent, or Firm*—McDonnell Boehnen Hulbert & Berghoff

(57) ABSTRACT

A test glass slide for an automated biological reaction apparatus is disclosed. The test slide monitors to operational temperature of the apparatus for maintenance/quality control purposes by means of at least two temperature-sensitive indicators, which change visual states once a predetermined temperature threshold is reached. The thresholds correspond generally to the specified temperature range for the protocol performed by the apparatus.

3 Claims, 4 Drawing Sheets

TEMPERATURE MONITORING SYSTEM FOR AN AUTOMATED BIOLOGICAL REACTION APPARATUS

BACKGROUND OF THE INVENTION

The present invention relates generally to an automated biological reaction apparatus ("ABRA"). Two such ABRA's are shown in U.S. Pat. No. 5,595,707 ("'707 Patent") and International Application No. PCT/US98/16604 (Pub. No. WO 99/08090), and the teachings thereof are fully incorporated herein by reference. More particularly, the present invention relates to a temperature monitoring system, including test glass slide, for use in an ABRA to verify proper operational temperature therein for each protocol.

The ABRA performs the steps of an immunohistochemical assay at the established temperature for the selected protocol. A glass slide, prepared with the tissue section under examination, carries a bar code readable by the ABRA to identify the selected protocol.

Under the regulations of the College of American Pathologists ("CAP"), any such ABRA must be tested periodically to verify that the temperature parameters of each protocol are met. At present, such testing and verification must be performed in accordance with the manufacturer's specifications. To-date, such testing requires a qualified service technician and typically results in several hours of "down time" for the ABRA. In extreme situations, the ABRA is rendered "inoperative" until a service call can be scheduled.

SUMMARY OF THE INVENTION

In a principal aspect, the present invention is a system for monitoring the temperature experienced by a glass slide in an ABRA, which allows CAP verification by the ABRA user directly, without the need for a qualified service technician. The system includes low and high temperature-sensitive indicators attached to the glass slide at predetermined locations. Each temperature-sensitive indicator has a threshold and an initial visual state. Each indicator changes to an altered visual state whenever subjected to a temperature at or above its threshold.

The system further includes a bar code, affixed to the glass slide and readable by the ABRA to set the selected protocol, which defines a specified temperature range. The low and high temperature thresholds correspond generally to the specified temperature range for the protocol.

It is thus an object of the present invention to provide easy, user-based testing of an ABRA. Another object is a test glass slide to quickly and inexpensively determine the operational state of an ABRA. Yet another object is readily manufactured test glass slide to determine the temperature applied to a tissue specimen in an ABRA and to provide permanent record thereof.

These and other features, objects and advantages of the present invention are set forth or apparent in the following detailed description.

BRIEF DESCRIPTION OF THE DRAWING

Various preferred embodiments of the present invention are described herein with reference to the drawing herein.

DETAILED DESCRIPTION OF VARIOUS PREFERRED EMBODIMENTS

Figure 1:
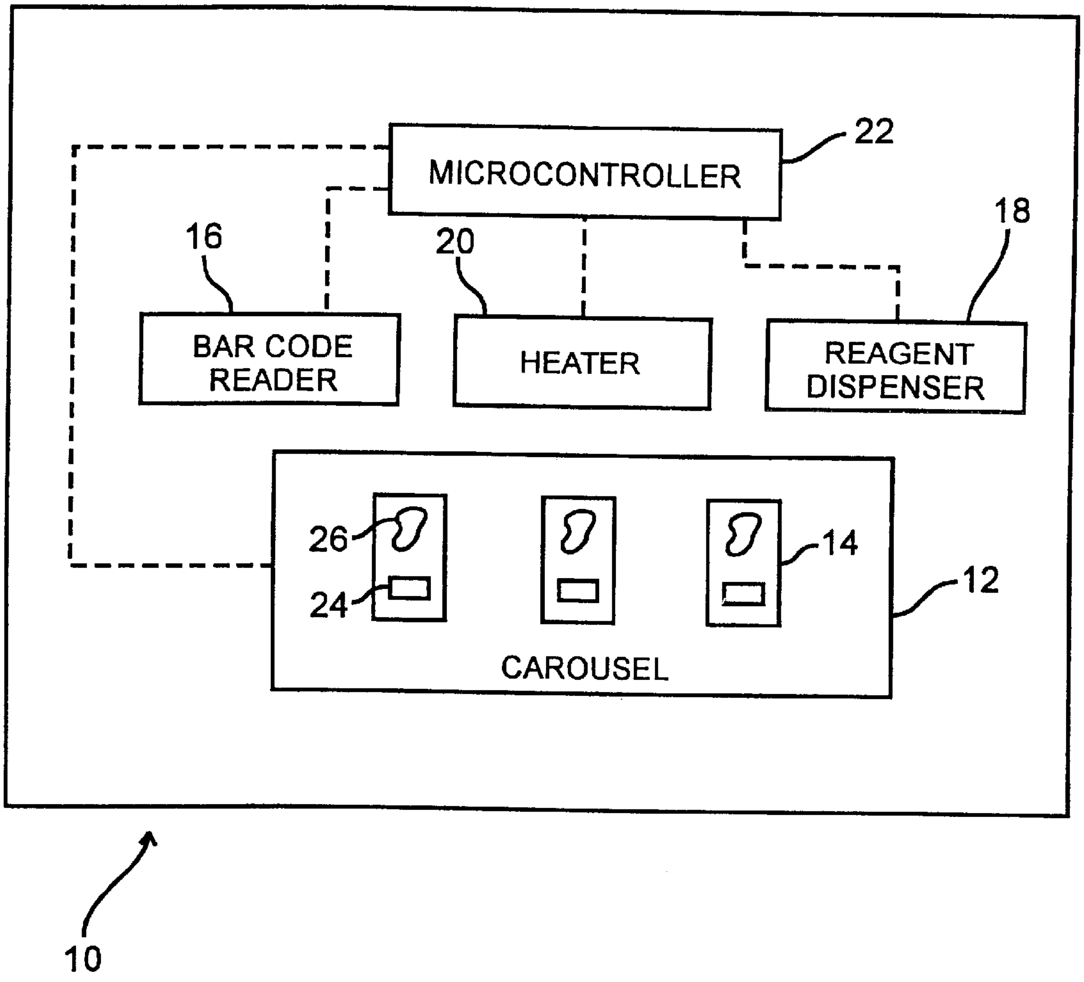
FIG. 1 is a simplified schematic diagram of an ABRA.

With reference first to FIG. 1, an ABRA 10 is depicted schematically and includes a carousel 12 for holding a series of glass slides 14, a bar code reader 16, a reagent dispenser 18, a heater 20, and a microcontroller 22 for control thereof. Each glass slide 14 carries a bar code 24 representing the protocol for the human tissue specimen 26 to be stained for diagnostic purposes. As is fully explained in the '707 Patent, each glass slide 14, with rotation of the carousel 12, passes the bar code reader 16. With the protocol information from the bar code reader 16, the microcontroller 22 causes reagent application upon the specimen 26 at the dispenser 18. The microcontroller 22 subsequently activates the heater 20, such that the glass slide 14 and specimen 26 are warmed to a temperature which, under proper conditions, falls within a specified temperature range for the selected protocol (as stored in the microcontroller 22).

Figure 2:
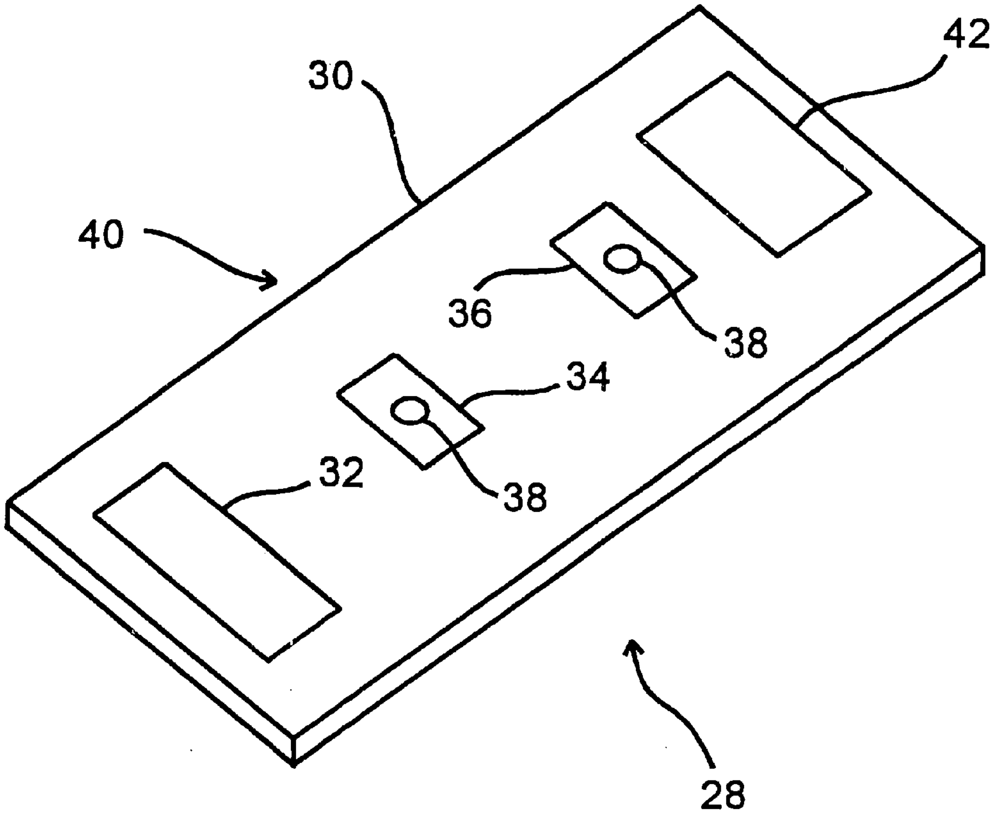
FIG. 2 is a perspective view of a test glass slide representing a preferred embodiment of the present invention.

Referring now to FIG. 2, the present invention is shown as a temperature monitoring system, generally designated 28, for the ABRA 10. The system 28 includes a test glass slide 30 for use with the ABRA 10. The test glass slide 30 is similar in shape and configuration to the glass slide 14 and is readily accepted by the ABRA 10 and its components. The test glass slide 30 includes a bar code 32 similar in shape, configuration and placement to the bar code 24, such that the protocol under investigation, and more particularly the specified temperature range therefor, are established by conventional operation of the bar code reader 16 and microcontroller 22.

The test glass slide 30 has at least low, or first, and high, or second, temperature-sensitive indicators 34, 36, respectively, attached thereto at predetermined locations corresponding generally to the position otherwise taken by the human tissue specimen. As used herein, the term "temperature-sensitive indicator" and obvious modifications thereof refer to any mechanism having a initial, or first, visual state and transforming, or changing, to an altered, or second, visual state whenever subjected to a temperature substantially equal to or above a predetermined threshold. For example, the temperature-sensitive indicator may have an initial substantially transparent state, turning substantially opaque whenever its environment exceeds the predetermined temperature threshold.

Such indicators are currently available in the form of labels, paints and crayons. Each type is commercially available from Omega Engineering, Inc., in Stamford, Conn.

With particular reference again to the preferred embodiment shown in FIG. 2, the low and high indicators 34, 36 are adhesively affixed labels, and each has a central, substantially circular temperature-sensitive "dot" 38. The low temperature-sensitive indicator 34 has, or defines, a low threshold having a predetermined relationship to the low temperature of the temperature range for the protocol established by the bar code 32. Preferably the low threshold substantially corresponds to that low temperature. The high temperature-sensitive indicator 36 has a high threshold, preferably substantially corresponding to the high temperature of the specified temperature range.

During testing, the test glass slide 30 is mounted on the carousel 12 and operation of the ABRA 10 is initiated, as is conventionally and well known. The microcontroller 22 causes the heater 20 to warm the test glass slide 30, and the low and high temperature-sensitive indicators 34, 36 either maintain the initial visual state or switch to the altered visual state, depending upon the temperature achieved during processing. In this preferred embodiment, and with proper operation of the ABRA 10, only the low temperature-sensitive indicator 34 switches visual states. That is, the high temperature-sensitive indicator 36 will remain in the initial visual state, as its threshold (representing the maximum specified temperature for the protocol) will not be reached or exceeded.

The commercially available indicators have two forms—reversible and irreversible. In the reversible form, the indicator reverts to the initial visual state as its temperature cools below the switching threshold. In the irreversible form, once the threshold is reached or exceeded, the indicator remains in the altered, second visual state. In the preferred embodiment shown in FIG. 2, the indicators 34, 36 are irreversible, such that the test glass slide 30, after testing, represents a permanent record of the operational temperature of the ABRA 10 for the tested protocol. As such, the indicators 34, 36 cooperate to define recordation means, generally designated 40, for recording the protocol temperature experienced by the test glass slide 30. For purposes hereof, the test glass slide 30 includes a blank label 42 upon which the test date is entered.

Figure 3:
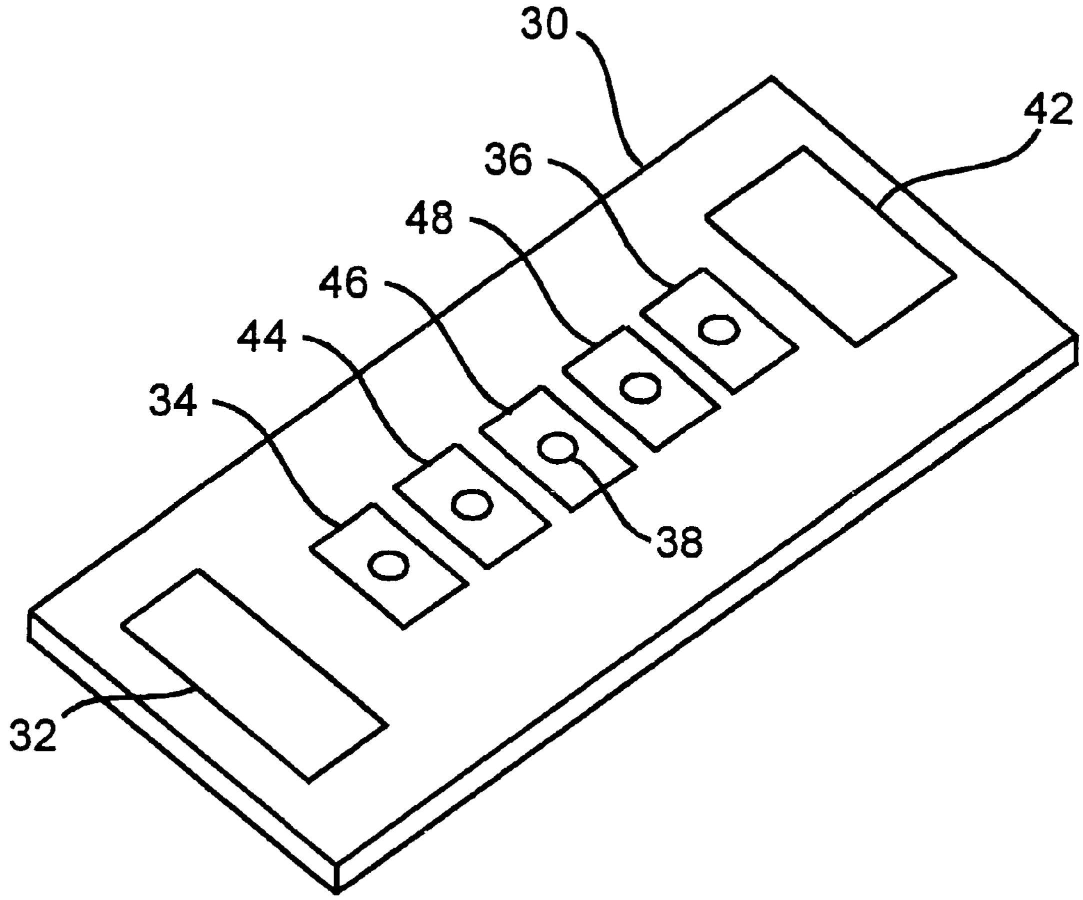
FIG. 3 is a perspective view of a test glass slide representing another preferred embodiment of the present invention.

A second preferred embodiment of the present invention is shown in FIG. 3, wherein elements common to FIGS. 2 and 3 are designated by the same reference numeral. This test glass slide 30 includes third, fourth and fifth temperature-sensitive indicators 44, 46, 48, respectively, having thresholds spanning the mid-range of the temperature range specified for the selected protocol. For example, for a specified temperature range of 100 to 110° C., the thresholds for the indicators 34, 36, 44, 46, 48 are 100, 103, 105, 107 and 110° C. respectively. With these three additional indicators 44, 46, 48, the operation of the ABRA 10 is more accurately monitored and more precisely calibrated to the preferred temperature for the protocol.

Figure 4:
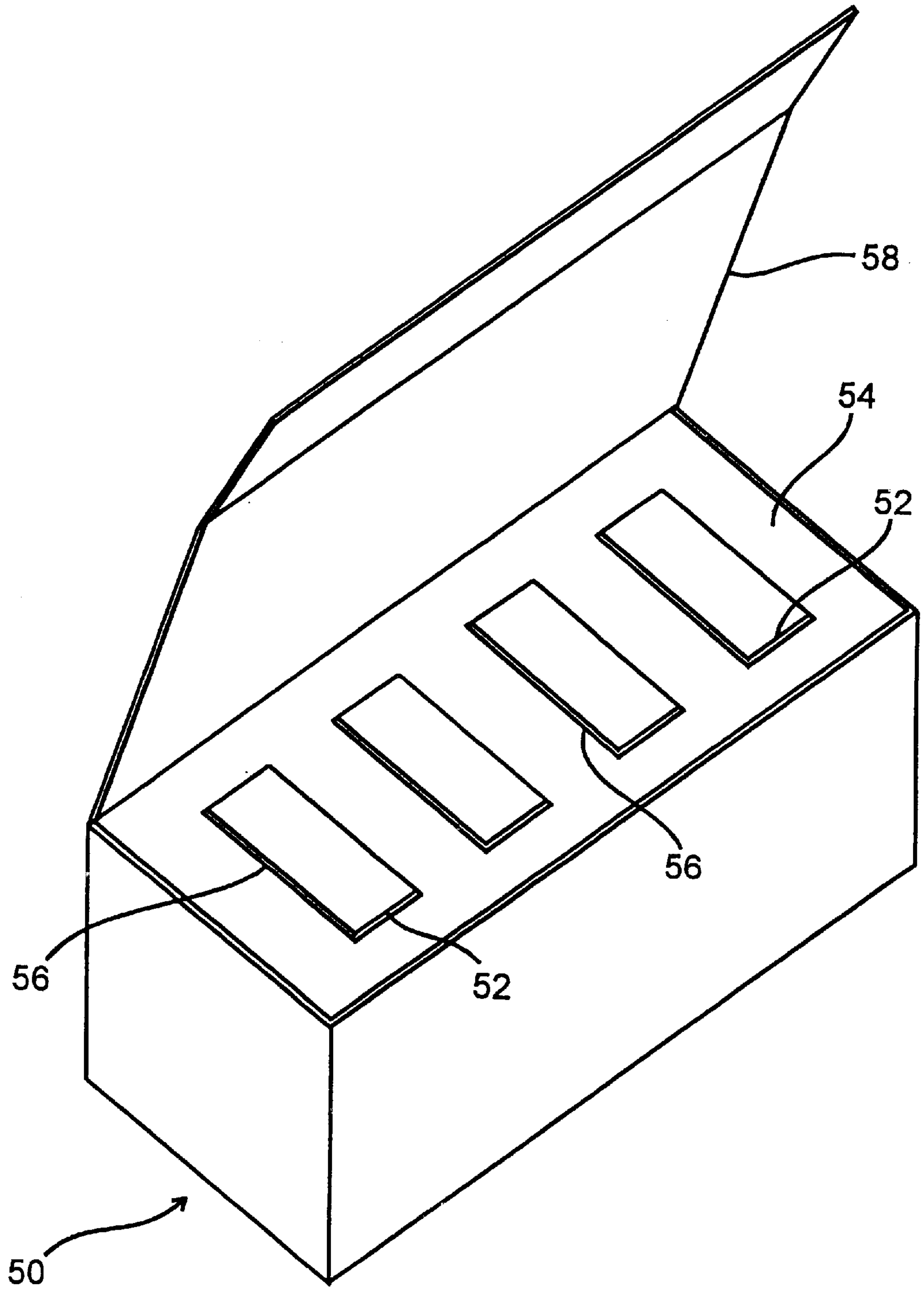
FIG. 4 is a perspective of yet another preferred embodiment in the form of a test kit.

In FIG. 4, another preferred embodiment of the present invention is shown as a test kit, generally designated 50, for an ABRA 10. Five test glass slides 30 fit within a conventional plastic glass slide box 52, and four such boxes 52 are mounted in a foam insert 54 having four corresponding recesses 56. The foam insert 54 resides in a cardboard package 58 to facilitate shipping and handling. The five slides 30 in any given box 52 relate to a single protocol. The four boxes 52 in the kit 52 may contain slides 30 for a single protocol or for four different protocols.

Various preferred embodiments of the present invention have been described herein. It is to be understood that modifications and changes can be made without departing from the true scope and spirit of the present invention, as defined by the following claims which are to be interpreted in view of the foregoing.

We claim:

1. A system for monitoring an actual temperature experienced by a glass slide heated in an automated biological reaction apparatus, having an acceptable operational temperature range defined by a low temperature limit and a high temperature limit, said low and high temperature limits exceeding ambient temperature, comprising, in combination:

a low temperature-sensitive indicator attached to said glass slide at a first predetermined location;

said low temperature-sensitive indicator having a low temperature threshold and a low initial visual state, said low temperature threshold being substantially equal to said low temperature limit of said acceptable operational temperature range, said low temperature-sensitive indicator irreversibly changing to a low altered visual state whenever heated to a temperature substantially equal to or above said low temperature threshold; and at least a high temperature-sensitive indicator attached to said glass slide at a second predetermined location;

said high temperature-sensitive indicator having a high temperature threshold and a high initial visual state, said high temperature threshold being above said low temperature threshold and substantially equal to said high temperature limit of said acceptable operational temperature range, said high temperature-sensitive indicator irreversibly changing to a high altered visual state whenever subjected to a temperature substantially equal to or above said high temperature threshold;

said low and high temperature-sensitive indicators cooperatively defining recordation means for substantially permanently recording that said actual temperature falls within said acceptable temperature range whenever, upon execution of said automated biological reaction apparatus, said low temperature-sensitive indicator is in said low altered visual state and said high temperature-sensitive indicator is in said high initial visual state.

2. A test slide for an automated biological reaction apparatus utilizing a bar code to establish a protocol, said protocol having a predetermined above-ambient temperature range with a lower limit and an upper limit, said automated biological reaction apparatus executing said protocol and heating said test slide to a temperature in response to said bar code, comprising in combination:

a glass slide of the type accepted by said automated biological reaction apparatus;

said bar code affixed to said glass slide at a predetermined location and readable by said automated biological reaction apparatus;

a first temperature-sensitive indicator affixed to said glass slide and having a first temperature threshold; and a second temperature-sensitive indicator affixed to said glass slide and having a second temperature threshold;

said first and second temperature thresholds substantially corresponding to said lower and upper limits of said predetermined above-ambient temperature range, respectively;

said first and second temperature-sensitive indicators cooperatively defining recordation means for substantially permanently recording that said temperature falls within said predetermined above-ambient temperature range after execution of said protocol upon said test slide by said automated biological reaction apparatus.

3. A test slide for monitoring an actual temperature experienced in an automated biological reaction apparatus operating in a predetermined protocol having an acceptable above-ambient temperature range defined by a low limit and a high limit, comprising, in combination:

a glass slide of the type accepted by said automated biological reaction apparatus, a low temperature-sensitive indicator attached to said glass slide at a first predetermined location;

said low temperature-sensitive indicator having a low threshold and a low initial visual state, said low threshold corresponding to said low limit, said low temperature-sensitive indicator irreversibly changing to a low altered visual state whenever subjected to a temperature substantially equal to or above said low threshold; and at least a high temperature-sensitive indicator attached to said glass slide at a second predetermined location;

said high temperature-sensitive indicator having a high threshold and a high initial visual state, said high threshold being above said low threshold and substantially corresponding to said high limit, said high temperature-sensitive indicator irreversibly changing to a high altered visual state whenever subjected to a temperature substantially equal to or above said high threshold;

said low and high temperature-sensitive indicators cooperatively defining recordation means for substantially permanently recording that said actual temperature falls within said acceptable temperature range whenever, after execution of said predetermined protocol by said automated biological reaction apparatus said low temperature-sensitive indicator is in said low altered visual state and said high temperature-sensitive indicator is in said high initial visual state.

* * * * *